(12) United States Patent
Dong et al.

(10) Patent No.: US 12,222,502 B2
(45) Date of Patent: Feb. 11, 2025

(54) OPTICAL SYSTEM, DISPLAY APPARATUS, AND SMART GLASSES

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Ruijun Dong, Beijing (CN); Chenru Wang, Beijing (CN); Ke Li, Beijing (CN); Yulong Wu, Beijing (CN); Na Han, Beijing (CN); Jiarong Bai, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 764 days.

(21) Appl. No.: 17/434,954

(22) PCT Filed: Dec. 30, 2020

(86) PCT No.: PCT/CN2020/141358
§ 371 (c)(1),
(2) Date: Aug. 30, 2021

(87) PCT Pub. No.: WO2021/196783
PCT Pub. Date: Oct. 7, 2021

(65) Prior Publication Data
US 2022/0326521 A1 Oct. 13, 2022

(30) Foreign Application Priority Data
Mar. 31, 2020 (CN) .......................... 202010247475.6

(51) Int. Cl.
*G02B 27/01* (2006.01)

(52) U.S. Cl.
CPC .. *G02B 27/0172* (2013.01); *G02B 2027/0178* (2013.01)

(58) Field of Classification Search
CPC ..... G02B 27/00–648; G02B 2027/0105–0198; G03B 21/00–64
See application file for complete search history.

(56) References Cited

U.S. PATENT DOCUMENTS 6,342,871 B1    1/2002   Takeyama
9,897,811 B2    2/2018   Martinez et al.
(Continued)

FOREIGN PATENT DOCUMENTS

CN       1769930 A    5/2006
CN    101176019 A    5/2008
(Continued)

OTHER PUBLICATIONS

Jiang Yang et al., Design of optical system of HMD using hybrid refractive/diffractive and free-form surfaces, Optics and Precision Engineering, Mar. 2011, p. 508-514, vol. 19, No. 3, China Academic Journal Electronic Publishing House, China.
(Continued)

*Primary Examiner* — Bao-Luan Q Le
*Assistant Examiner* — Christopher A Lamb, II
(74) *Attorney, Agent, or Firm* — IP & T GROUP LLP (57) ABSTRACT

An optical system, a display apparatus, and smart glasses are provided. The optical system includes a transflective element, a reflective element and a plurality of microstructures. The transflective element is configured to reflect collimated incident light to the reflective element. The reflective element is configured to reflect the collimated incident light back to a light incident surface of the transflective element, so as to adjust an angle at which the collimated incident light exits. The transflective element is further configured to
(Continued)

transmit the reflected-back collimated incident light to a target region. The plurality of microstructures are configured to adjust angles at which ambient stray light incident on surfaces thereof exits, and to scatter the ambient stray light out of the target region.

16 Claims, 5 Drawing Sheets

(56) References Cited

U.S. PATENT DOCUMENTS

| | | | |
|---|---|---|---|
| 2003/0035454 A1* | 2/2003 | Hwang | H01S 5/423 438/22 |
| 2006/0109569 A1 | 5/2006 | Ogawa et al. | |
| 2006/0119802 A1 | 6/2006 | Akiyama | |
| 2006/0204745 A1 | 9/2006 | Jones et al. | |
| 2010/0195201 A1 | 8/2010 | Minoura et al. | |
| 2013/0258709 A1 | 10/2013 | Thompson et al. | |
| 2014/0132937 A1 | 5/2014 | Daniels | |
| 2015/0177516 A1 | 6/2015 | Blonde et al. | |
| 2016/0216524 A1* | 7/2016 | Deng | G02B 27/0172 |
| 2016/0238846 A1 | 8/2016 | Sugihara et al. | |
| 2016/0313494 A1* | 10/2016 | Hamilton | C03C 15/00 |
| 2017/0115486 A1 | 4/2017 | Border et al. | |
| 2017/0336539 A1 | 11/2017 | Perreault et al. | |
| 2018/0210208 A1 | 7/2018 | Zhou et al. | |
| 2018/0210209 A1 | 7/2018 | Osterhout et al. | |
| 2018/0313981 A1* | 11/2018 | Cobb | G02B 27/0018 |
| 2018/0329208 A1 | 11/2018 | Masuda | |
| 2019/0101759 A1 | 4/2019 | Usukura et al. | |
| 2019/0229486 A1 | 7/2019 | Taira et al. | |
| 2019/0293937 A1 | 9/2019 | Ma | |
| 2019/0302329 A1 | 10/2019 | Jin et al. | |
| 2019/0302468 A1 | 10/2019 | Koshihara | |
| 2020/0326583 A1 | 10/2020 | Lin et al. | |
| 2021/0141146 A1* | 5/2021 | Melli | G02B 6/0063 |
| 2021/0173216 A1* | 6/2021 | Xiao | G02B 5/288 |
| 2021/0191029 A1 | 6/2021 | Jin et al. | |
| 2021/0223675 A1 | 7/2021 | Wang et al. | |
| 2021/0302746 A1 | 9/2021 | Gao et al. | |

FOREIGN PATENT DOCUMENTS

| | | |
|---|---|---|
| CN | 101809498 A | 8/2010 |
| CN | 102654589 A | 9/2012 |
| CN | 103809292 A | 5/2014 |
| CN | 104730713 A | 6/2015 |
| CN | 104808270 A | 7/2015 |
| CN | 106133674 A | 11/2016 |
| CN | 106764939 A | 5/2017 |
| CN | 106855655 A | 6/2017 |
| CN | 107300777 A | 10/2017 |
| CN | 107966812 A | 4/2018 |
| CN | 108020883 A | 5/2018 |
| CN | 108351528 A | 7/2018 |
| CN | 108375840 A | 8/2018 |
| CN | 108398787 A | 8/2018 |
| CN | 108469642 A | 8/2018 |
| CN | 207780379 U | 8/2018 |
| CN | 207780380 U | 8/2018 |
| CN | 108490610 A | 9/2018 |
| CN | 108594535 A | 9/2018 |
| CN | 108700682 A | 10/2018 |
| CN | 208044197 U | 11/2018 |
| CN | 108957750 A | 12/2018 |
| CN | 109343219 A | 2/2019 |
| CN | 110407157 A | 11/2019 |
| CN | 110515214 A | 11/2019 |
| CN | 110554557 A | 12/2019 |
| CN | 110703439 A | 1/2020 |
| CN | 110865458 A | 3/2020 |
| CN | 110879491 A | 3/2020 |
| CN | 110908032 A | 3/2020 |
| CN | 111290128 A | 6/2020 |
| EP | 1845393 A2 | 10/2007 |
| EP | 2677358 A1 | 12/2013 |
| EP | 3451041 A2 | 3/2019 |
| JP | 2000-206446 A | 7/2000 |
| JP | 2018-054827 A | 4/2018 |
| WO | 2015/109145 A1 | 7/2015 |
| WO | 2017/164117 A1 | 9/2017 |
| WO | 2019/079014 A1 | 4/2019 |
| WO | 2020/021277 A1 | 1/2020 |

OTHER PUBLICATIONS

Lu Xiangbo et al., Lightweight Design of a Helmet-Mounted Display Optical System, Oct. 2015, p. 1022007-1-1022007-8, vol. 35, No. 10, ACTA Optica Sinica, China.

The First Office Action of Priority Application No. CN 202010247475.6 issued by the Chinese Patent Office on Mar. 1, 2021.

Notice of Allowance of Priority Application No. CN 202010247475.6 issued by the Chinese Patent Office on Jul. 2, 2021.

* cited by examiner

OPTICAL SYSTEM, DISPLAY APPARATUS, AND SMART GLASSES

CROSS-REFERENCE TO RELATED APPLICATIONS

This application is a national phase entry under 35 USC 371 of International Patent Application No. PCT/CN2020/141358, filed on Dec. 30, 2020, which claims priority to Chinese Patent Application No. 202010247475.6, filed on Mar. 31, 2020, which are incorporated herein by reference in their entirety.

TECHNICAL FIELD

The present disclosure relates to the field of display technologies, and in particular, to an optical system, a display apparatus, and smart glasses.

BACKGROUND

With the development of display technologies, more and more different types of display apparatuses have appeared in people's life. Virtual reality (VR) display apparatuses and augmented reality (AR) display apparatuses have attracted extensive attention due to their advantages such as convenient wearing and strong practicability.

SUMMARY

In an aspect, an optical system is provided. The optical system includes a transflective element and a reflective element. Extension lines of the transflective element and the reflective element intersect. A light incident surface of the transflective element is disposed proximate to the reflective element, and a light exit surface thereof is disposed away from the reflective element. The transflective element is configured to reflect collimated incident light to the reflective element. The reflective element is configured to reflect the collimated incident light back to the light incident surface of the transflective element, so as to adjust an angle at which the collimated incident light exits. The transflective element is further configured to transmit the collimated incident light reflected back by the reflective element to a target region.

The optical system further includes a plurality of microstructures disposed on the light exit surface of the transflective element. The plurality of microstructures are configured to adjust angles at which ambient stray light incident on surfaces thereof exits, and to scatter the ambient stray light out of the target region.

In some embodiments, the plurality of microstructures include a plurality of prisms arranged in parallel. A parallel direction of the plurality of prisms intersects an incident direction of the ambient stray light.

In some embodiments, a prism in the plurality of prisms is a triangular prism. A cross section of the triangular prism perpendicular to refracting surfaces thereof has a shape of a non-isosceles triangle.

In some embodiments, the non-isosceles triangle has an apex angle away from the light exit surface of the transflective element, and a first base angle and a second base angle that are proximate to the light exit surface of the transflective element. A value of the apex angle is in a range of 85° to 105°, inclusive. A value of the first base angle is in a range of 15° to 25°, inclusive. A value of the second base angle is in a range of 60° to 70°, inclusive. Along an exit direction of the collimated incident light, the first base angle is located at a side of the second base angle away from the reflective element.

In some embodiments, the plurality of microstructures are of an integral structure.

In some embodiments, the plurality of microstructures and the transflective element are of an integral structure.

In some embodiments, a material of the plurality of microstructures includes silicon oxide, silicon nitride, or silicon oxynitride.

In some embodiments, a refractive index of a material of the plurality of microstructures is the same as or similar to a refractive index of a material of the transflective element.

In some embodiments, the reflective element includes a reflective lens or a transflective lens.

In some embodiments, the reflective element is an arc-shaped lens. A curvature center of the arc-shaped lens is located at a side thereof proximate to the transflective element.

In some embodiments, the optical system further includes a collimating element. The collimating element, the reflective element, and the transflective element are arranged in a triangular shape. The collimating element is configured to provide the collimated incident light to the light incident surface of the transflective element.

In some embodiments, the transflective element and the reflective element are arranged at a first included angle. A value of the first included angle is in a range of 40° to 50°, inclusive.

In some embodiments, the transflective element and the collimating element are arranged at a second included angle. A value of the second included angle is in a range of 40° to 50°, inclusive.

In another aspect, a display apparatus is provided. The display apparatus includes a display panel and the optical system according to some embodiments described above. The optical system is disposed on a light exit side of the display panel.

In some embodiments, the optical system includes a collimating element, and the collimating element, the reflective element and the transflective element are arranged in a triangular shape; the collimating element is configured to provide the collimated incident light to the light incident surface of the transflective element. The collimating element is opposite to a light exit surface of the display panel, and an orthogonal projection of the collimating element on the display panel covers at least a light exit region of the display panel.

In yet another aspect, smart glasses are provided. The smart glasses include a frame and the display apparatus according to some embodiments described above mounted on the frame.

In some embodiments, the reflective element includes the reflective lens and a light-reflecting coating disposed on a surface of the reflective lens away from the transflective element.

In some embodiments, the collimating element includes a collimating lens or a light collimator.

BRIEF DESCRIPTION OF THE DRAWINGS

In order to describe technical solutions in some embodiments of the present disclosure more clearly, accompanying drawings to be used in the description of some embodiments will be introduced briefly below. Obviously, the accompanying drawings to be described below are merely accompanying drawings of some embodiments of the present disclosure, and a person of ordinary skill in the art may obtain other drawings according to these drawings.

DETAILED DESCRIPTION

Technical solutions in some embodiments of the present disclosure will be described clearly and completely below with reference to the accompanying drawings in some embodiments of the present disclosure. Obviously, the described embodiments are merely some but not all embodiments of the present disclosure. All other embodiments obtained by a person of ordinary skill in the art based on some embodiments of the present disclosure shall be included in the protection scope of the present disclosure.

At present, the use of a birdbath optical system in a virtual reality (VR) display apparatus and an augmented reality (AR) display apparatus may make the VR display apparatus or the AR display apparatus have outstanding advantages such as being light and thin, high image quality, large viewing angle, and low cost.

Figure 1:
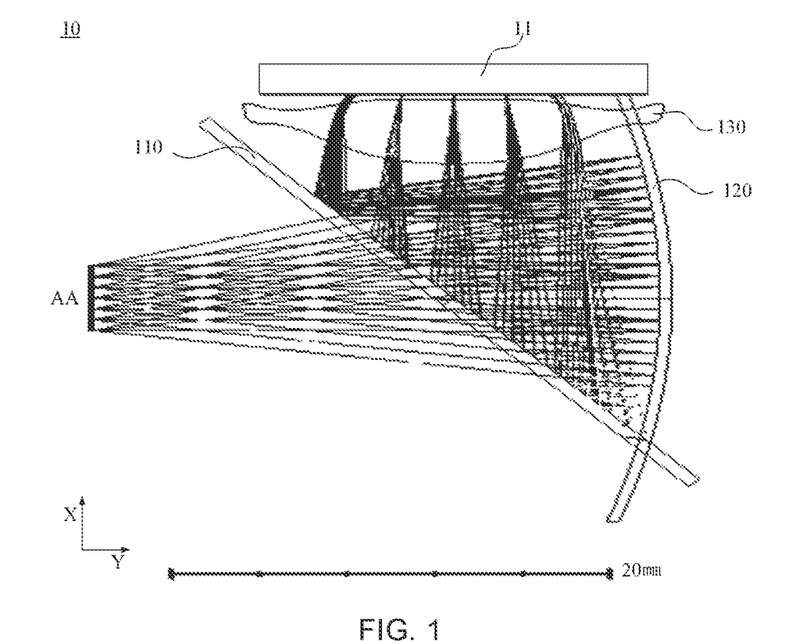
FIG. 1 is a diagram showing an ideal optical path of an optical system, in accordance with embodiments of the present disclosure.
Figure 2:
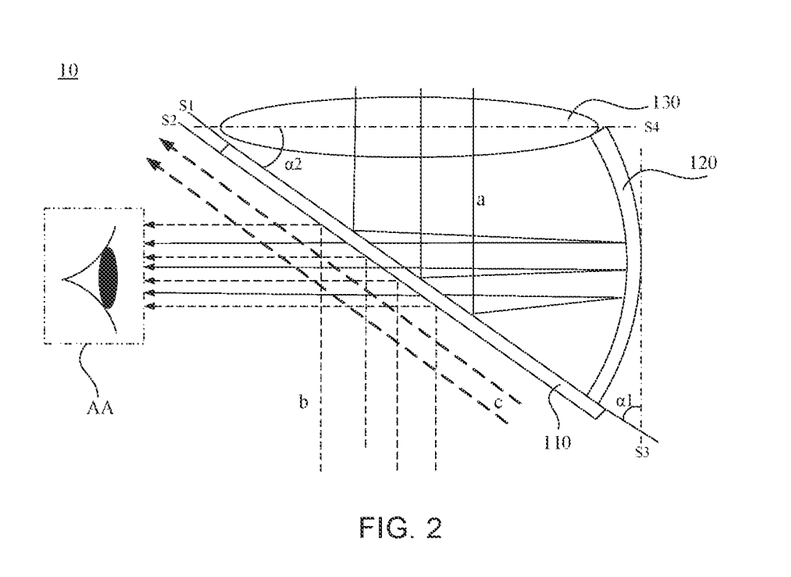
FIG. 2 is a diagram showing an actual optical path of an optical system, in accordance with embodiments of the present disclosure.

Some embodiments of the present disclosure provide an optical system to be applied to the VR display apparatus and the AR display apparatus. Referring to FIGS. 1 and 2, the optical system 10 includes a transflective element 110 and a reflective element 120. Extension lines of the transflective element 110 and the reflective element 120 intersect. A light incident surface S1 of the transflective element 110 is disposed proximate to the reflective element 120, and a light exit surface S2 thereof is disposed away from the reflective element 120. The transflective element 110 is configured to reflect collimated incident light to the reflective element 120. The reflective element 120 is configured to reflect the collimated incident light back to the light incident surface S1 of the transflective element 110, so as to adjust an angle at which the collimated incident light exits. The transflective element 110 is further configured to transmit the collimated incident light reflected back by the reflective element to a target region AA.

Herein, the transflective element 110 has both a reflection function and a transmission function. A reflectivity and a transmittance of the transflective element 110 may be selectively set according to actual needs. For example, the reflectivity of the transflective element 110 is in a range of 40% to 60%, inclusive. In some embodiments, the reflectivity of the transflective element 110 is 50%, that is, the transflective element is a half-transmitting and half-reflecting element, which may make the transflective element 110 have both a good reflection effect and a good transmission effect.

It can be understood that, in a case where light provided by a light source 11 is non-collimated incident light, with continued reference to FIGS. 1 and 2, the optical system 10 further includes a collimating element 130. The collimating element 130 is configured to provide collimated incident light to the light incident surface S1 of the transflective element 110. The collimating element 130, the reflective element 120, and the transflective element 110 are arranged in a triangular shape, and may be connected in sequence or arranged at intervals.

For example, the transflective element 110 and the reflective element 120 are arranged at a first included angle α1. The first included angle α1 is an included angle between connecting portions of the transflective element 110 and the reflective element 120, or an included angle between a plane where the transflective element 110 is placed and a plane where the reflective element 120 is placed, etc. This is not limited in the embodiments of the present disclosure, and may be reasonably set according to actual needs. For example, the reflective element 120 is an arc-shaped lens, a plane where the arc-shaped lens is placed is a tangent plane of a convex vertex of the arc-shaped lens, and the first included angle α1 is an included angle between the light incident surface S1 of the transflective element 110 and the plane where the arc-shaped lens is placed.

The transflective element 110 and the collimating element 130 are arranged at a second included angle α2. The second included angle α2 is an included angle between connecting portions of the transflective element 110 and the collimating element 130, or an included angle between the plane where the transflective element 110 is placed and a plane where the collimating element 130 is placed, etc. This is not limited in the embodiments of the present disclosure, and may be reasonably set according to actual needs.

Optionally, a value of the first included angle α1 is in a range of 40° to 50°, inclusive, and a value of the second included angle α2 is in a range of 40° to 50°, inclusive.

In some examples, as shown in FIG. 1, beams, emitted by different regions of the light source 11, at different angles are incident on the light incident surface S1 of the transflective element 110 as the collimated incident light after being collimated by the collimating element 130. Due to the reflection effect of the transflective element 110, the collimated incident light may be reflected to the reflective element 120. Then, the reflective element 120 reflects the collimated incident light back to the light incident surface S1 of the transflective element 110, so that the collimated incident light reflected back by the reflective element may be accurately emitted as effective light to the target region AA, such as an eye box region of a human eye.

Herein, an overall volume of the optical system 10 is small, and a unilateral dimension thereof (i.e., a dimension along a certain direction of a coordinate system, e.g., a length, a width, or a height) is less than or equal to 20 mm.

In some other examples, as shown in FIG. 2, the collimating element 130 is placed horizontally, and the second included angle α2 is an included angle between the light incident surface S1 of the transflective element 110 and a horizontal plane S4, which may be, for example, 40°, 45° or 50°. The reflective element 120 is placed vertically, and the first included angle α1 is an included angle between the light incident surface S1 of the transflective element 110 and a vertical plane S3, which may be, for example, 40°, 45°, or 50°.

For example, the second included angle α2 is 45°, and the first included angle α1 is 45°. The collimated incident light provided by the collimating element 130 is vertical light a. After being incident on the light incident surface S1 of the transflective element 110, the vertical light a may be reflected by the transflective element 110 to the reflective element 120. Then, the reflective element 120 reflects the vertical light a back to the light incident surface S1 of the transflective element 110, and the reflected-back vertical light a is converged as effective light from the light exit surface S2 of the transflective element 110 to the target region AA, such as the eye box region of the human eye.

It will be noted that, since the transflective element 110 has both the reflection function and the transmission function, the vertical light a is not totally reflected by the transflective element 110 to the reflective element 120, and a part of the vertical light a passes through the transflective element 110. Similarly, the vertical light a reflected back by the reflective element 120 to the light incident surface S1 of the transflective element 110 does not totally pass through the transflective element 110, and a part of the vertical light a reflected back by the reflective element 120 is reflected at the light incident surface S1 of the transflective element 110. Therefore, the description of the collimated incident light and light of other types in the embodiments of the present disclosure and the drawings are merely to clearly describe main propagation paths thereof instead of all true propagation paths thereof. This may also be regarded as that only propagation of the effective light in various light is described, while ineffective light in various light is ignored. In addition, in the drawings of the embodiments of the present disclosure, diagrams showing optical paths of light of various types are only schematic, and these optical paths are slightly different from the true light propagation paths, which is allowed.

With continued reference to FIG. 2, the light exit surface S2 of the transflective element 110 is inclined to an exit direction of the collimated incident light (e.g., the vertical light a). For example, an included angle therebetween is 45°. Based on this, due to optical characteristics of the transflective element 110, the transflective element 110 is able to both reflect light and transmit light. Therefore, external ambient light incident on the light exit surface S2 of the transflective element 110 at a certain angle, such as ambient light b in FIG. 2, is easily reflected by the transflective element 110 to the target region AA, thereby affecting an exit effect of the effective light exiting from the transflective element 110. Of course, it can be understood that, if an incident direction of the external ambient light is parallel to the light exit surface S2 of the transflective element 110, such as ambient light c in FIG. 2, the external ambient light will naturally not be reflected by the transflective element 110 to the target region AA. Therefore, in the embodiments of the present disclosure, the external ambient light, which may be reflected by the light exit surface S2 of the transflective element 110 to the target region AA and affect the exit effect of the effective light, is defined as ambient stray light.

Figure 3:
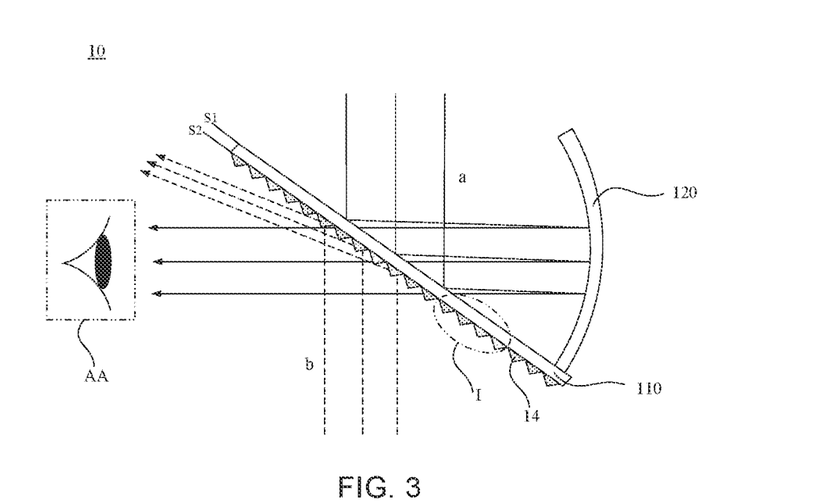
FIG. 3 is a schematic diagram showing a structure of an optical system, in accordance with embodiments of the present disclosure.
Figure 4:
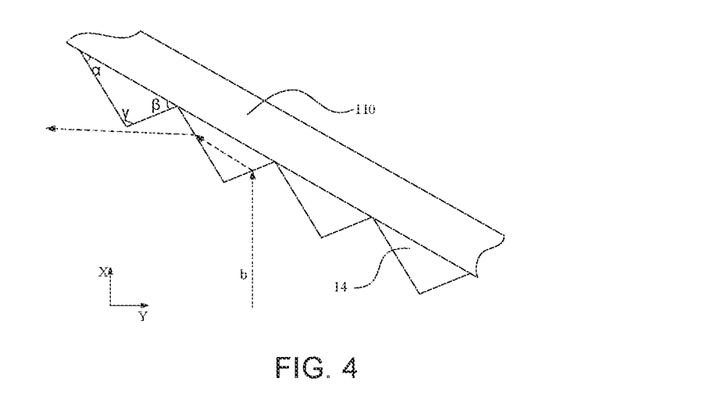
FIG. 4 is a local enlarged view of the region I in the optical system shown in FIG. 3.

Based on this, referring to FIGS. 3 and 4, the optical system 10 further includes a plurality of microstructures 14 disposed on the light exit surface S2 of the transflective element 110. The plurality of microstructures 14 are configured to adjust angles at which the ambient stray light incident on surfaces thereof exits, and to scatter the ambient stray light out of the target region AA. In the embodiments of the present disclosure, the plurality of microstructures 14 are disposed on the light exit surface S2 of the transflective element 110, and the ambient stray light may be modulated out of the target region AA by using the plurality of microstructures 14, thereby preventing the ambient stray light from affecting the effective light exiting from the transflective element 110.

In a case where the effective light is display light, the embodiments of the present disclosure may well improve influence of the ambient stray light on display effect without affecting the display effect of the effective light. Moreover, in the embodiments of the present disclosure, the plurality of microstructures 14 are disposed on the light exit surface S2 of the transflective element 110. In this way, in a case where the target region AA is the eye box region of the human eye, the microstructures 14 do not block a field of view of a user, which is beneficial to achieving an application of the optical system 10 in an AR display field.

The microstructures 14 may be selectively set according to actual needs.

In some embodiments, with continued reference to FIGS. 3 and 4, the plurality of microstructures 14 include a plurality of prisms arranged in parallel. A direction in which the prisms are parallel intersects with an incident direction of the ambient stray light. For example, they are perpendicular. In this way, the ambient stray light may directly enter insides of the prisms, and the angles at which the ambient stray light exits may be changed due to a scattering effect of the prisms. A shape and a size of the prisms may be selectively set according to actual needs, as long as the exit effect of the effective light is not affected, and the angles at which the ambient stray light exits can be adjusted.

For example, a prism in the plurality of prisms is a triangular prism. A cross section of the triangular prism perpendicular to refracting surfaces thereof has a shape of a non-isosceles triangle. As shown in FIG. 4, the non-isosceles triangle has an apex angle γ away from the light exit surface S2 of the transflective element 110, and a first base angle α and a second base angle β that are proximate to the light exit surface S2 of the transflective element 110. The first base angle α and the second base angle β are not equal.

Herein, the triangular prism has a bottom face and two side faces that are arranged along an extension direction of a length of the triangular prism. The bottom face is located on the light exit surface S2 of the transflective element 110, and the two side faces are correspondingly refracting surfaces. The apex angle γ is an included angle between the two refracting surfaces. The first base angle α and the second base angle 1 are included angles between the refracting surfaces and the bottom face.

Optionally, a value of the apex angle γ is in a range of 85° to 105°, inclusive. A value of the first base angle α is in a range of 15° to 25°, inclusive. A value of the second base angle 1 is in a range of 60° to 70°, inclusive. Along an exit direction of the collimated incident light, the first base angle α is located at a side of the second base angle 1 away from the reflective element. The second base angle 3 is located on an incident side of the ambient stray light. That is, the ambient stray light may enter a corresponding prism from a side where the second base angle 1 is located, and then exit from a side where the first base angle α is located.

Figure 8:
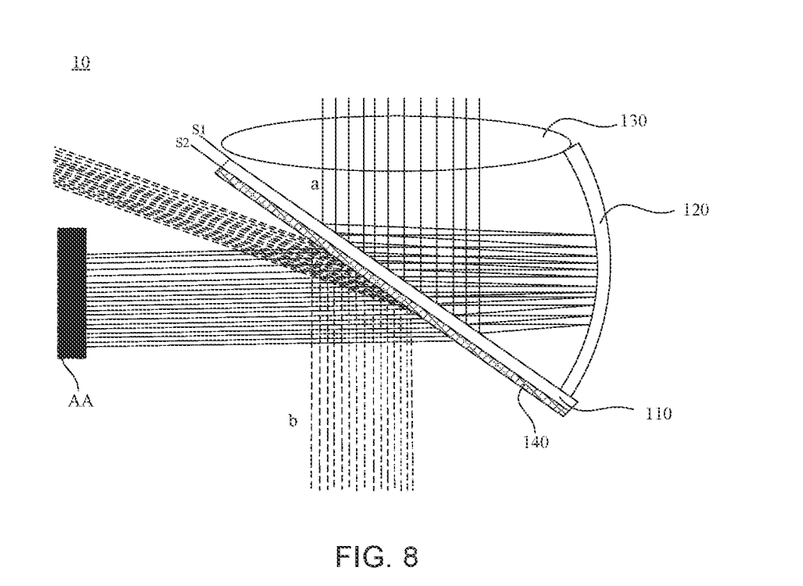
FIG. 8 is a light track tracing diagram of an optical system, in accordance with embodiments of the present disclosure.

For convenience of description, the following embodiments will be described by taking an example in which the optical system 10 includes the collimating element 130, the collimating element 130 is placed horizontally, and the first included angle α1 and the second included angle α2 are each 45°. However, this is not a limitation of the embodiments of the present disclosure. With continued reference to FIGS. 3 and 4, the apex angle γ of the non-isosceles triangle is 95°, the first base angle α is 20°, and the second base angle 3 is 65°. External ambient light entering the microstructures 14 from directly below the light exit surface S2 of the transflective element 110, i.e., in a vertical direction, is the ambient stray light (e.g., the ambient light b). In this way, after a simulation of the optical system 10 in the present embodiments, a corresponding light track tracing diagram of the optical system 10 is shown in FIG. 8.

It can be seen from FIG. 8 that, the ambient stray light (e.g., the ambient light b) entering the microstructures 14 from directly below the transflective element 110 may be effectively scattered out of the target region AA by the microstructures 14. Of course, due to the influence of the microstructures 14, there is a slight deflection (which does not exceed 5°) in an exit direction of the effective light (e.g., the vertical light a) exiting from the light exit surface S2 of the transflective element 110. Although the slight deflection of the effective light does not adversely affect the exit effect thereof, by tilting the optical system 10 as a whole, an angle at which the effective light exits and the exit effect thereof may be further ensured.

The transflective element 110 may be an optical element with a transflective function, such as transflective glass or a transflective lens, which is not limited in the embodiments of the present disclosure. The microstructures 14 may be disposed on the light exit surface S2 of the transflective element 110 in various ways.

Figure 5:
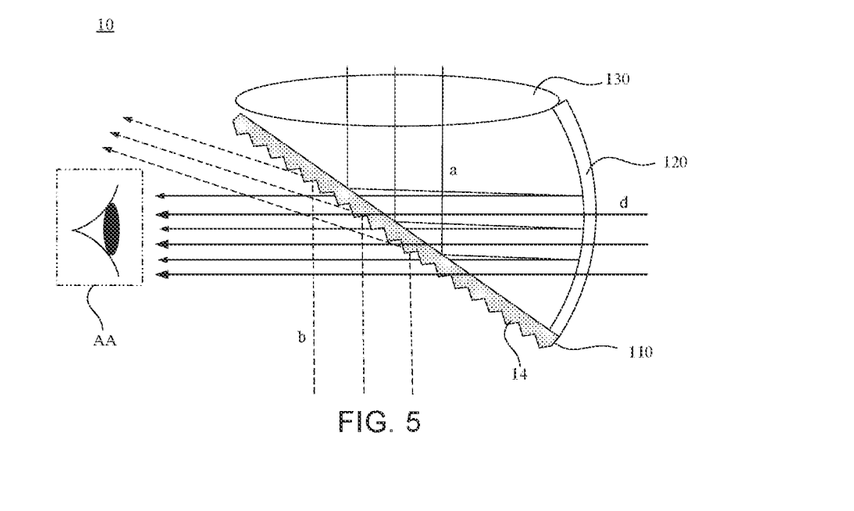
FIG. 5 is a schematic diagram showing a structure of another optical system, in accordance with embodiments of the present disclosure.

In some examples, as shown in FIG. 5, the plurality of microstructures 14 and the transflective element 110 are integrally formed. That is, the plurality of microstructures 14 are fabricated as the light exit surface S2 of the transflective element 110 by using micro-nano processing technology such as nanoimprint lithography. This facilitates manufacturing and facilitates to simplify a manufacturing process.

In some other examples, the plurality of microstructures 14 are of an integral structure. That is, the plurality of microstructures 14 are fabricated in a same film, such as a microstructure layer 140 shown in FIGS. 6 and 7. The microstructure layer 140 may be formed by means of attachment or by directly forming a film on the light exit surface S2 of the transflective element 110. The microstructures in the microstructure layer 140 are able to transmit the effective light to the target region AA, and adjust and control the angles at which the ambient stray light exits, so as to scatter the ambient stray light out of the target region AA.

A material of the microstructures 14 may be selectively set according to actual needs. For example, the material of the microstructures 14 is an inorganic light-transmissive material such as silicon oxide, silicon nitride, or silicon oxynitride. In this way, by using the inorganic light-transmissive material, it may be possible not only to ensure that the microstructures 14 have a good light transmittance, but also to facilitate fabrication of the microstructures 14 with a good structural stability. Of course, the material of the microstructures 14 is not limited thereto, and other materials with same or similar optical properties are also applicable.

In addition, in some embodiments, a refractive index of the material of the microstructures 14 is the same as or similar to a refractive index of a material of the transflective element 110. In this way, it may be possible to ensure that light passing through the transflective element 110 passes through the microstructures 14 and then exits, and to prevent the light passing through the transflective element 110 from being deflected at a large angle due to refraction when passing through the microstructures 14.

The refractive index of the material of the microstructures 14 being similar to the refractive index of the material of the transflective element 110 means that a difference between the refractive indexes is less than or equal to a threshold. The threshold may be reasonably preset according to actual needs. For example, the threshold is 0.1.

For example, the transflective element 110 is the transflective glass. The refractive index of the material of the microstructures 14 is in a range of 1.5 to 1.6, inclusive.

In some embodiments, the collimating element 130 includes a collimating lens or a light collimator. The reflective element 120 includes a reflective lens or a transflective lens. Of course, the structures of the collimating element 130 and the reflective element 120 are not limited thereto, and other optical devices with same or similar properties are also applicable.

For example, the collimating element 130 is the collimating lens. The reflective element 120 is an arc-shaped lens, and a curvature center p of the arc-shaped lens is located on a side thereof proximate to the transflective element 110. That is, the arc-shaped lens protrudes in a direction away from the transflective element 110, so as to facilitate to reflect and converge the collimated incident light.

In this way, referring to FIGS. 3 and 5, when the transflective element 110 reflects the collimated incident light (e.g., the vertical light a) to the arc-shaped lens, an arc-shaped curved surface of the arc-shaped lens is able to reflect the collimated incident light toward a direction proximate to the curvature center of the arc-shaped lens and back to the light incident surface S1 of the transflective element 110, so that the collimated incident light is converged to the target region AA.

Herein, it will be noted that, in a case where the incident light is the display light, the collimating lens and the arc-shaped lens are matched for use, so that magnification and optical focusing of a displayed image may be achieved.

In the embodiments of the present disclosure, the optical system 10 is formed in a triangular shape by the collimating element 130, the reflective element 120, and the transflective element 110, and the optical system 10 has a hollow and compact structure, which is beneficial to achieving lightness and thinness. In a case where the collimating element 130 is the collimating lens, the reflective element 120 is the arc-shaped lens, and the transflective element 110 is the transflective glass, difficulty in processing each component in the optical system 10 is low, which is beneficial to reducing a manufacturing cost of the optical system 10. Moreover, with cooperation of the collimating element 130, the reflective element 120 and the transflective element 110, an expanded optical path of the incident light in the optical system 10 may be a straight line. That is, the optical system 10 is a coaxial optical system, which may ensure that the optical system 10 has a large viewing angle, and effectively ensure a quality of the displayed image in the case where the incident light is the display light.

In addition, the structure of the reflective element 120 is related to application of the optical system 10 in VR display or AR display.

In some examples, the optical system 10 is applied to the AR display. As shown in FIG. 5, the reflective element 120 is the transflective lens. In addition to reflecting the collimated incident light (e.g., the vertical light a) to the light incident surface S1 of the transflective element 110, the transflective lens is further able to transmit external ambient light (e.g., light d) at a side thereof away from the transflective element 110 to the light incident surface S1 of the transflective element 110, so as to achieve the AR display.

A reflectivity and a transmittance of the transflective lens may be selectively set according to actual needs. For example, the reflectivity of transflective lens is in a range of 40% to 60%, inclusive. In some embodiments, the reflectivity of the transflective lens is 50%. That is, the transflective lens is a half-transmitting and half-reflecting lens, so that the reflective element 120 may have both a good reflection effect and a good transmission effect.

Herein, the external ambient light (e.g., the light d) at the side of the reflective element 120 away from the transflective element 110 is effective light. The transflective element 110 is able to make the external ambient light as the effective light and the collimated incident light (e.g., the vertical light a) enter the target region AA.

In the present embodiments, the optical system 10 may have a large viewing angle, for example, 50° or more. Moreover, in a case where a volume of the optical system 10 allows, a value of the viewing angle of the optical system 10 may be in a range of 80° to 90°, inclusive.

Figure 6:
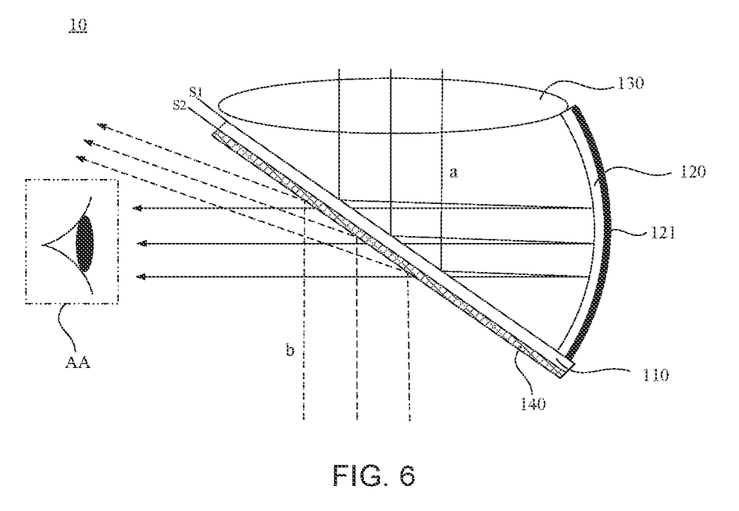
FIG. 6 is a schematic diagram showing a structure of yet another optical system, in accordance with embodiments of the present disclosure.
Figure 7:
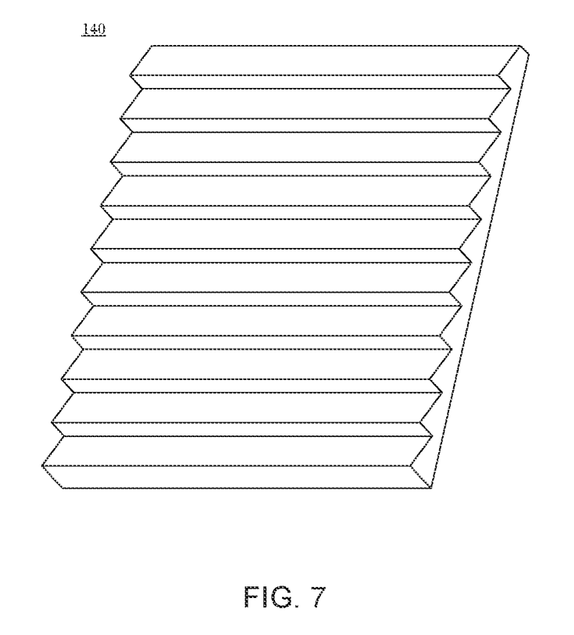
FIG. 7 is a schematic diagram showing a structure of a microstructure film, in accordance with embodiments of the present disclosure.

In some other examples, the optical system 10 is applied to the VR display. As shown in FIG. 6, the reflective element 120 is the reflective lens. A surface of the reflective lens away from the transflective element 110 is provided with a light-reflecting coating 121, and the light-reflecting coating 121 is able to block the external ambient light at the side of the reflective lens away from the transflective element 110. The reflective lens is only used to reflect the collimated incident light (e.g., the vertical light a) back to the light incident surface S1 of the transflective element 110. In the present embodiments, the external ambient light (e.g., the light d) at the side of the reflective lens away from the transflective element 110 is ineffective light.

Optionally, the light-reflecting coating 121 is made of a light-reflecting material with a high reflectivity, for example, a metal material such as silver.

Figure 9:
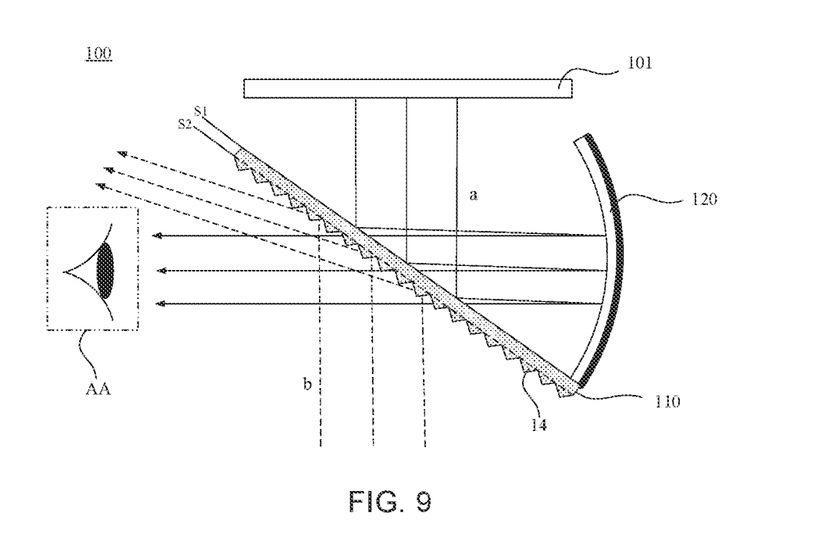
FIG. 9 is a schematic diagram showing a structure of a display apparatus, in accordance with embodiments of the present disclosure.
Figure 10:
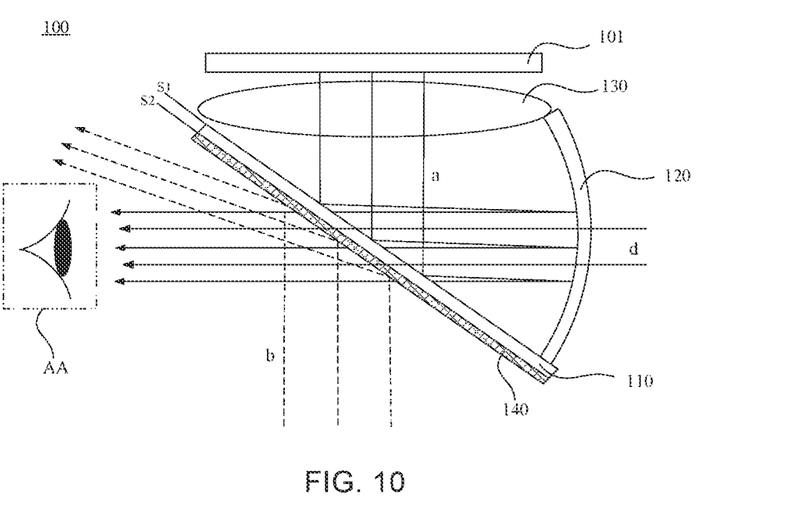
FIG. 10 is a schematic diagram showing a structure of another display apparatus, in accordance with embodiments of the present disclosure.

Based on the technical solution of the optical system 10 described above, some embodiments of the present disclosure provide a display apparatus. Referring to FIGS. 9 and 10, the display apparatus 100 includes a display panel 101 and the optical system 10 described in some embodiments described above. The optical system 10 is disposed on a light exit side of the display panel 101.

Herein, the display panel 101 is able to directly emit collimated display light as the collimated incident light of the optical system 10. Thus, the collimating element 130 may not be included in the optical system 10, for example, as shown in FIG. 9.

In some embodiments, referring to FIG. 10, the optical system 10 includes the collimating element 130. The collimating element 130 is opposite to a light exit surface of the display panel 101, and an orthogonal projection of the collimating element 130 on the display panel 101 covers at least a light exit region of the display panel 101. That is, the display light emitted by the display panel 101 may all be collimated by the collimating element 130.

In addition, optionally, the display apparatus 100 is a VR display apparatus or an AR display apparatus. Based on this, the display panel 101 is a micro display panel. That is, a panel size and sizes of sub-pixels of the display panel 101 are both small. For example, the display panel 101 is a micro light-emitting diode (abbreviated as micro LED) display panel, or a micro organic light-emitting diode (abbreviated as micro OLED) display panel, etc. A specific type of the display panel 101 may be selectively set according to actual needs.

Beneficial effects that may be achieved by the display apparatus 100 in the embodiments of the present disclosure are the same as beneficial effects that may be achieved by the optical system 10, which will not be repeated herein.

The display apparatus 100 in the above embodiments may be applied to various head-mounted smart devices, such as smart glasses or a smart helmet, so as to achieve the VR display or the AR display.

Figure 11:
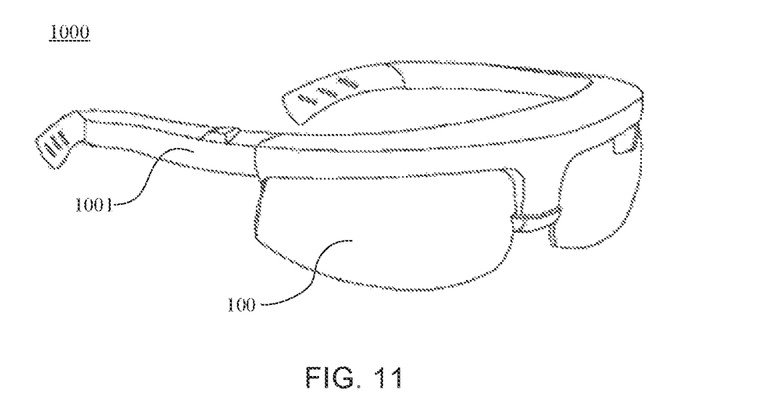
FIG. 11 is a schematic diagram showing a structure of smart glasses, in accordance with embodiments of the present disclosure.

Referring to FIG. 11, some embodiments of the present disclosure provide smart glasses 1000. The smart glasses 1000 include a frame 1001 and the display apparatus 100 described in some embodiments described above mounted on the frame 1001.

A structure and a material of the frame 1001 may be selectively set according to actual needs.

The display apparatus 100 adopts a lens structure, and is mounted on the frame 1001. The light exit surface S2 of the transflective element 110 is a display surface of the display apparatus 100. That is, the light exit surface S2 of the transflective element 110 faces eyes of the user.

In some examples, the smart glasses 1000 are VR smart glasses. The reflective element 120 in the display apparatus 100 is the reflective lens.

In some other examples, the smart glasses 1000 are AR smart glasses. The reflective element 120 in the display apparatus 100 is the transflective lens.

Beneficial effects that may be achieved by the smart glasses 1000 in the embodiments of the present disclosure are the same as the beneficial effects that may be achieved by the display apparatus 100, which will not be repeated herein.

In the description of the above embodiments, specific features, structures, materials or characteristics may be combined in any suitable manner in any one or more embodiments or examples.

The foregoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. An optical system, comprising:
a transflective element and a reflective element that are disposed opposite to each other, extension lines of the transflective element and the reflective element intersecting; wherein a light incident surface of the transflective element is disposed proximate to the reflective element, and a light exit surface thereof is disposed away from the reflective element; the transflective element is configured to reflect collimated incident light to the reflective element; the reflective element is configured to reflect the collimated incident light back to the light incident surface of the transflective element, so as to adjust an angle at which the collimated incident light exits; and the transflective element is further configured to transmit the collimated incident light reflected back by the reflective element to a target region; and a plurality of microstructures disposed on the light exit surface of the transflective element; the plurality of microstructures being configured to adjust angles at which ambient stray light incident on surfaces thereof exits, and to scatter the ambient stray light out of the target region, wherein the plurality of microstructures include a plurality of prisms arranged in parallel; a prism in the plurality of prisms is a triangular prism; a cross section of the triangular prism perpendicular to refracting surfaces thereof has a shape of a non-isosceles triangle; and the non-isosceles triangle has an apex angle away from the light exit surface of the transflective element, and a first base angle and a second base angle that are proximate to the light exit surface of the transflective element, wherein a value of the apex angle is in a range of 85° to 105°, inclusive;

a value of the first base angle is in a range of 15° to 25°, inclusive; and a value of the second base angle is in a range of 60° to 70°, inclusive, and along an exit direction of the collimated incident light, the first base angle is located at a side of the second base angle away from the reflective element.

2. The optical system according to claim 1, wherein the plurality of microstructures are of an integral structure.

3. The optical system according to claim 1, wherein the plurality of microstructures and the transflective element are of an integral structure.

4. The optical system according to claim 1, wherein a material of the plurality of microstructures includes silicon oxide, silicon nitride, or silicon oxynitride.

5. The optical system according to claim 1, wherein a refractive index of a material of the plurality of microstructures is the same as or similar to a refractive index of a material of the transflective element.

6. The optical system according to claim 1, wherein the reflective element includes a reflective lens or a transflective lens.

7. The optical system according to claim 6, wherein the reflective element is an arc-shaped lens; and a curvature center of the arc-shaped lens is located at a side thereof proximate to the transflective element.

8. The optical system according to claim 6, wherein the reflective element includes the reflective lens and a light-reflecting coating disposed on a surface of the reflective lens away from the transflective element.

9. The optical system according to claim 1, further comprising a collimating element; wherein the collimating element, the reflective element and the transflective element are arranged in a triangular shape; and the collimating element is configured to provide the collimated incident light to the light incident surface of the transflective element.

10. The optical system according to claim 9, wherein the transflective element and the reflective element are arranged at a first included angle; and a value of the first included angle is in a range of 40° to 50°, inclusive.

11. The optical system according to claim 9, wherein the transflective element and the collimating element are arranged at a second included angle; and a value of the second included angle is in a range of 40° to 50°, inclusive.

12. The optical system according to claim 9, wherein the collimating element includes a collimating lens or a light collimator.

13. A display apparatus, comprising:
a display panel, and
the optical system according to claim 1, the optical system being disposed on a light exit side of the display panel.

14. The display apparatus according to claim 13, wherein the optical system includes a collimating element, and the collimating element, the reflective element and the transflective element are arranged in a triangular shape; the collimating element is configured to provide the collimated incident light to the light incident surface of the transflective element; and the collimating element is opposite to a light exit surface of the display panel, and an orthogonal projection of the collimating element on the display panel covers at least a light exit region of the display panel.

15. Smart glasses, comprising:
a frame, and
the display apparatus according to claim 14 mounted on the frame.

16. Smart glasses, comprising:
a frame, and
the display apparatus according to claim 13 mounted on the frame.

* * * * *